(12) United States Patent
Jensen et al.

(10) Patent No.: US 8,092,679 B1
(45) Date of Patent: *Jan. 10, 2012

(54) FLOATING AQUATIC PLANT CULTURE SYSTEMS AND ASSOCIATED METHODS

(75) Inventors: Kyle R. Jensen, Apopka, FL (US); G. Thomas Bland, Jr., Orlando, FL (US)

(73) Assignee: AquaFiber Technologies Corp., Orlando, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/851,102

(22) Filed: Aug. 5, 2010

Related U.S. Application Data

(63) Continuation of application No. 12/100,671, filed on Apr. 10, 2008, now Pat. No. 7,776,216.

(51) Int. Cl.
*C02F 3/32* (2006.01)

(52) U.S. Cl. .................. 210/602; 210/170.05; 210/242.1

(58) Field of Classification Search .................. 210/602, 210/170.01, 170.03, 170.05, 242.1
See application file for complete search history.

(56) References Cited

U.S. PATENT DOCUMENTS

| | | | | |
|---|---|---|---|---|
| 4,086,161 A | * | 4/1978 | Burton | 210/602 |
| 4,520,616 A | * | 6/1985 | Stewart et al. | 56/9 |
| 4,536,988 A | * | 8/1985 | Hogen | 47/1.5 |
| 4,779,404 A | * | 10/1988 | Bell | 56/9 |
| 4,888,912 A | * | 12/1989 | Murray | 47/1.4 |
| 5,766,474 A | * | 6/1998 | Smith et al. | 210/602 |
| 5,993,649 A | * | 11/1999 | DeBusk et al. | 210/97 |
| 6,751,903 B2 | * | 6/2004 | Shryock | 47/59 R |
| 7,776,216 B1 | * | 8/2010 | Jensen et al. | 210/602 |
| 2002/0117443 A1 | * | 8/2002 | Bailey et al. | 210/602 |
| 2004/0129188 A1 | * | 7/2004 | Traina | 110/233 |
| 2007/0209277 A1 | * | 9/2007 | Schuck et al. | 47/59 R |
| 2008/0135474 A1 | * | 6/2008 | Limcaco | 210/602 |
| 2009/0139927 A1 | * | 6/2009 | Kania et al. | 210/602 |

FOREIGN PATENT DOCUMENTS

JP 2000-37144 A * 2/2000

* cited by examiner

*Primary Examiner* — Fred Prince
(74) *Attorney, Agent, or Firm* — GrayRobinson, P.A.; Jacqueline E. Hartt; Carl M. Napolitano

(57) ABSTRACT

A floating plant culture system has improved strength and durability and includes a substantially planar platform having a length along opposed sides thereof and a width along front and back thereof generally perpendicular to the sides. The platform is adapted for growing a culture of attached plants including micro- and macrophytes thereon. Beneath the platform are affixed a plurality of cells extending in bridging relation to the sides and open at each end adjacent the sides. The cells are placeable in fluid communication with a body of water desired to be remediated. Affixed along at least a portion of the sides extend a pair of opposed hollow beams, for providing flotation to the platform. The beams are also placeable in fluid communication with the body of water, and an upper surface of the platform is floodable by the body of water from beneath for submerging plants attached thereto.

15 Claims, 4 Drawing Sheets

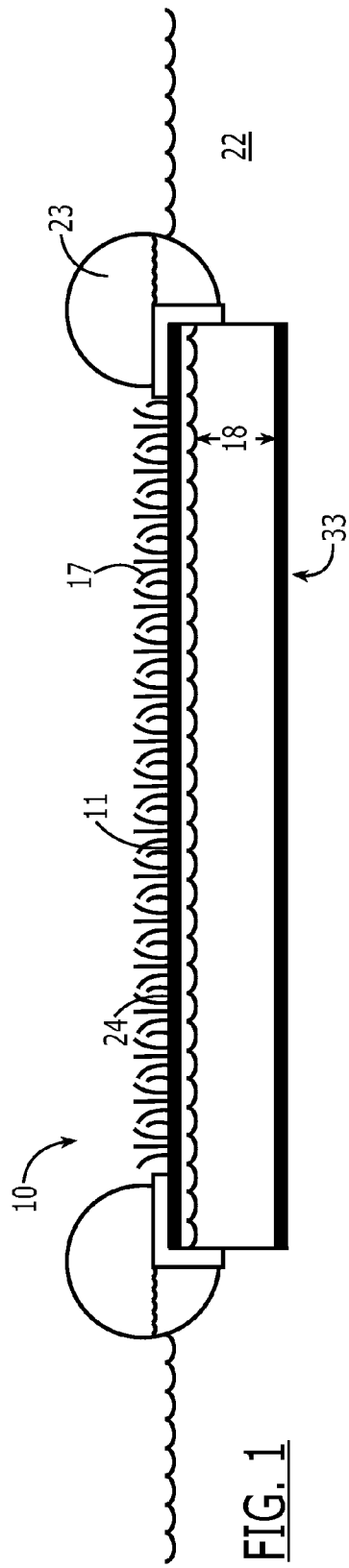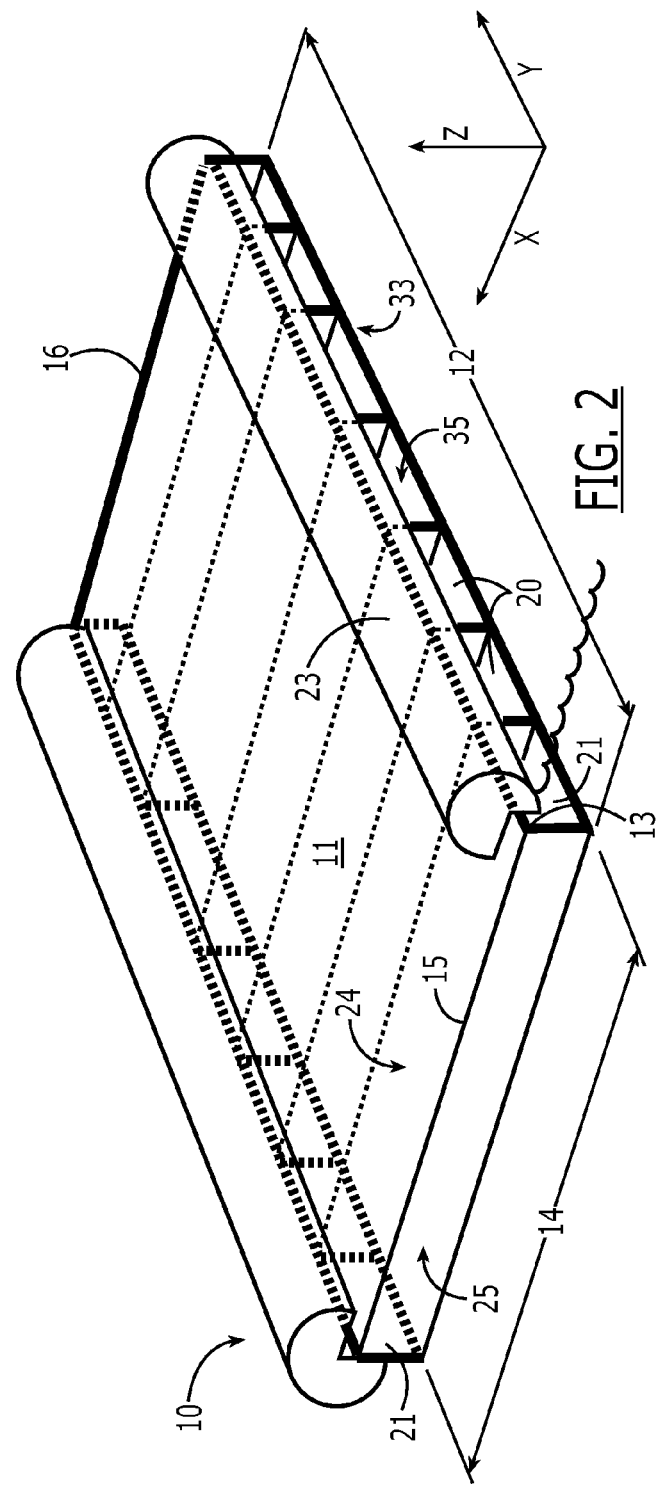

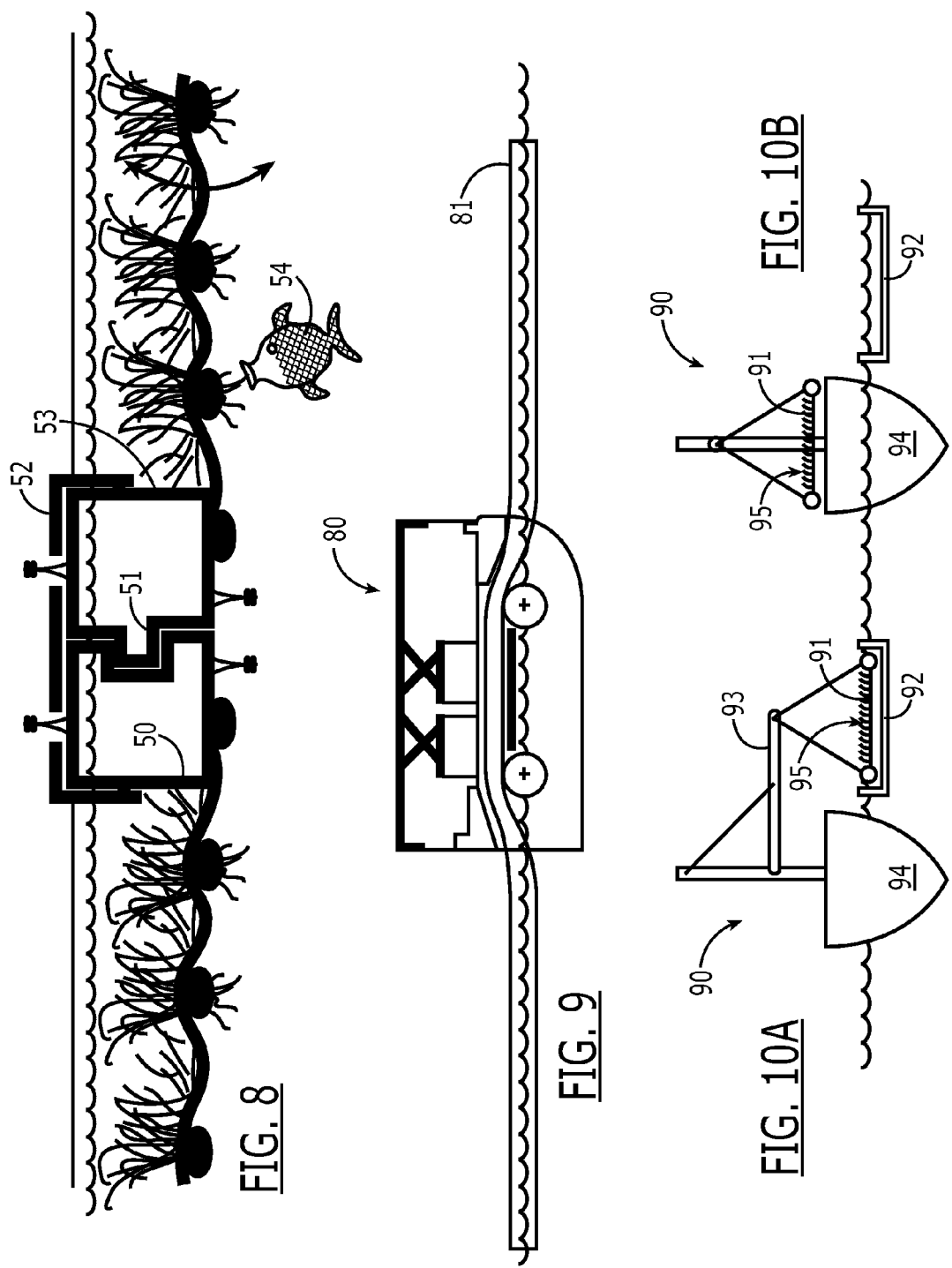

FLOATING AQUATIC PLANT CULTURE SYSTEMS AND ASSOCIATED METHODS

CROSS-REFERENCE TO RELATED APPLICATIONS

This application is a continuation of application Ser. No. 12/100,671, now U.S. Pat. No. 7,776,216, filed Apr. 10, 2008, which itself claims priority to provisional application Ser. No. 60/910,931, filed Apr. 10, 2007.

BACKGROUND OF THE INVENTION

1. Field of the Invention

The present invention relates to systems and methods for remediating water, and, more particularly, to such systems and methods that use aquatic plant cultures to remediate water.

2. Description of Related Art

Attached algal plant growth in shallow water is widely termed periphyton. The utilization of cycles of periphyton culturing and harvesting has proven to be an all-natural method to remove nutrients from polluted water. Compared with wetland treatment systems, periphyton filters have repeatedly demonstrated a removal of 100 to 1,000 times more nutrients per unit area. Among the work in the area can be included patents issued to one of the inventors of the present invention (KJ): U.S. Pat. Nos. 5,527,456; 5,573,669; 5,591,341; and 5,846,423.

High nutrients are a problem in global surface water because they support massive phytoplankton cultures, blocking light from rooted plants, which are an important habitat for a diverse and stable aquatic ecosystem.

The idea of culturing aquatic plants is ancient and has been practiced worldwide for centuries, mostly for food and fertilized production. Floating aquatic culture systems have been proposed for kelp production for energy purposes.

A floating aquatic periphyton culture system for fresh water nutrient removal is the "Lilypad," which comprises a 40-ft-diameter fiberglass-foam composite structure, with an axial flow pump and speed controller effecting radial horizontal flow. The system was operated in a public pond for 1.5 years, and was found to achieve an average 1-ft reduction in heavy organic deposits in the pond after 1 year of operation, from which it was deduced that oxygen from periphyton photosynthesis oxidized organic sediments.

It would be desirable to provide an improved system and method for contaminant removal in bodies of water.

SUMMARY OF THE INVENTION

The present invention is directed to a floating aquatic plant culture system that has improved strength and durability over systems known in the art. The floating plant culture system comprises a substantially planar platform having a length along opposed sides thereof and a width along front and back thereof generally perpendicular to the sides. The platform is adapted for growing a culture of plants thereon. The plant culture can comprise, for example, micro- and/or macrophyte plant species. The floating plant culture system can be operated in any depth of water.

Beneath the platform are affixed a plurality of cells extending in bridging relation to the sides and open at each end adjacent the sides. The cells are placeable in fluid communication with a body of water desired to be remediated.

Affixed along at least a portion of the sides extend a pair of opposed hollow beams, for providing flotation to the platform. The beams are also placeable in fluid communication with the body of water, and an upper surface of the platform is floodable by the body of water from beneath for submerging a plant culture comprising at least one of a micro- and a macrophyte attached thereto.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

BRIEF DESCRIPTION OF THE DRAWINGS

FIG. 1 is a front cross-sectional view of an embodiment of a floating aquatic plant culture system.

FIG. 2 is a top-side perspective view of the system of FIG. 1.

FIG. 8 is a vertical cross section of a system having interlocking elements.

FIG. 9 illustrates an exemplary embodiment of a harvesting apparatus.

FIGS. 10A, 10B illustrate a harvesting method using a panel removable from a frame in the water (FIG. 10A) and movable to a boat (FIG. 10B).

DETAILED DESCRIPTION OF THE PREFERRED EMBODIMENTS

Figure 3:
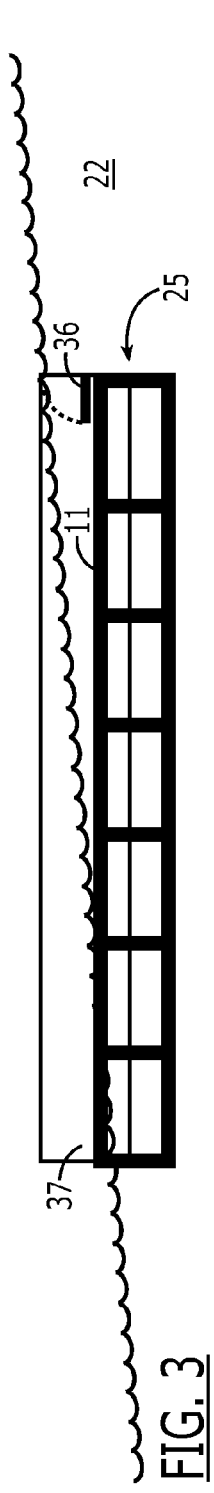
FIG. 3 is a cross-sectional view of the platform in the y direction, with a gate permitting flooding of the platform.
Figure 4:
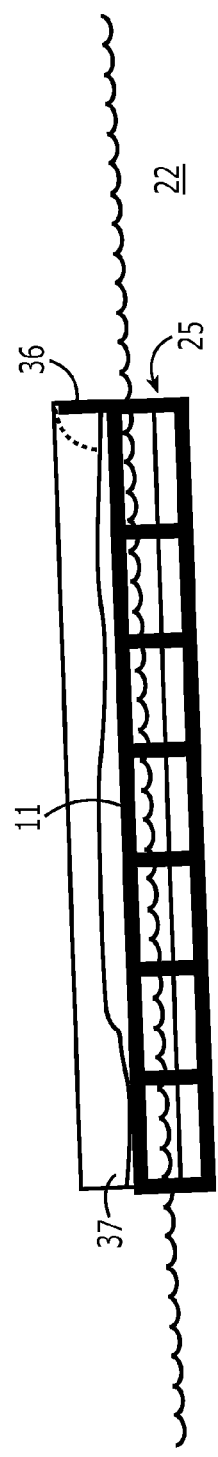
FIG. 4 is a cross-sectional view of the platform in the y direction, with the gate stopping water flow across the platform.

A description of the preferred embodiments of the present invention will now be presented with reference to FIGS. 1-10B.

A floating plant culture system 10 of the present invention comprises a substantially planar platform 11 having a length 12 along opposed sides 13 thereof and a width 14 along front end 15 and back end 16 thereof generally perpendicular to the sides 13 (FIGS. 1 and 2). The platform 11 is adapted for growing a culture of attached micro- or macrophytes 17 thereon, such as, but not intended to be limited to, periphyton.

In a particular embodiment, the platform 11 can comprise a durable material such as, but not intended to be limited to, one or more of a plastic such as high-density polyethylene (HDPE), a textile, or a wood product. The exemplary material HDPE has been shown to hold up to intense sunlight for many years. The platform 11 can have a width 14 of 4-20 ft, a length 12 of 100 ft, and a depth 18 of 2-48 in. Longer floways can be created if desired by linking platforms 11 end-to-end.

Beneath the platform 11 are affixed a plurality of cells 20 extending in bridging relation to the sides 13 and having an opening 35 at each end 21 adjacent the platform's sides 13. The cells 20 are placeable in fluid communication with a body of water 22 desired to be remediated. The cells 20 can also comprise HDPE and/or any of the materials disclosed above.

Affixed along at least a portion of the sides 13 extend a pair of opposed hollow beams 23, for providing flotation to the platform 11. The beams 23, which can also comprise HDPE, are also placeable in fluid communication with the body of water 22 via openings 35 at the ends, and an upper surface 24 of the platform 11 is floodable by the body of water 22 from beneath for submerging plants 17 attached thereto.

The structural design of the floating culture system 10 provides rigidity, resilience, and variable buoyancy. This cellular culture surface, being open to the water at the sides and flooded underneath the culture surface 24 from the underside 33, serves to contain water, provide ballast, and keep the construction 10 in the water during storm and wind events. The vertical elements of the cells 20 provide flexural rigidity in the x direction (see FIG. 2), and the beams 23 provide flexural rigidity in the y direction, which serves to contain the water being treated on the shallow culture surface. Together the beams 23 and platform 11 act in a composite structure with x and y flexural rigidity, which is economical, non-corrosive, UV resistant, flexible, and durable. The hollow beams 23 are capable of ballasting with water to adjust and change the depth of the culture surface for various operating conditions with variable speciation.

Another structural element of the system 10 comprises means for causing water to be conveyed across the partially floating culture surface by gravity and peristaltic action at the water/atmosphere interface. The platform has a wall 37 therearound, the wall having at an inlet end 25 a gate-style check valve 36 (FIGS. 3 and 4), which can lie down when the platform 11 is tilted in a first direction, letting water in but not out. When the inlet end 25 is lowered below the surface of the water, a portion of the platform 11 is flooded. When the inlet end 25 is raised to be tilted in a second direction opposite the first direction, the flooded water can flow horizontally across the culture surface 38 in a surge. This enhances growth, as is known in the art. This slow but effective means of causing water to traverse the platform 11 requires very little energy, as the pumping head is very small, typically less than 12 in.

Figure 5:
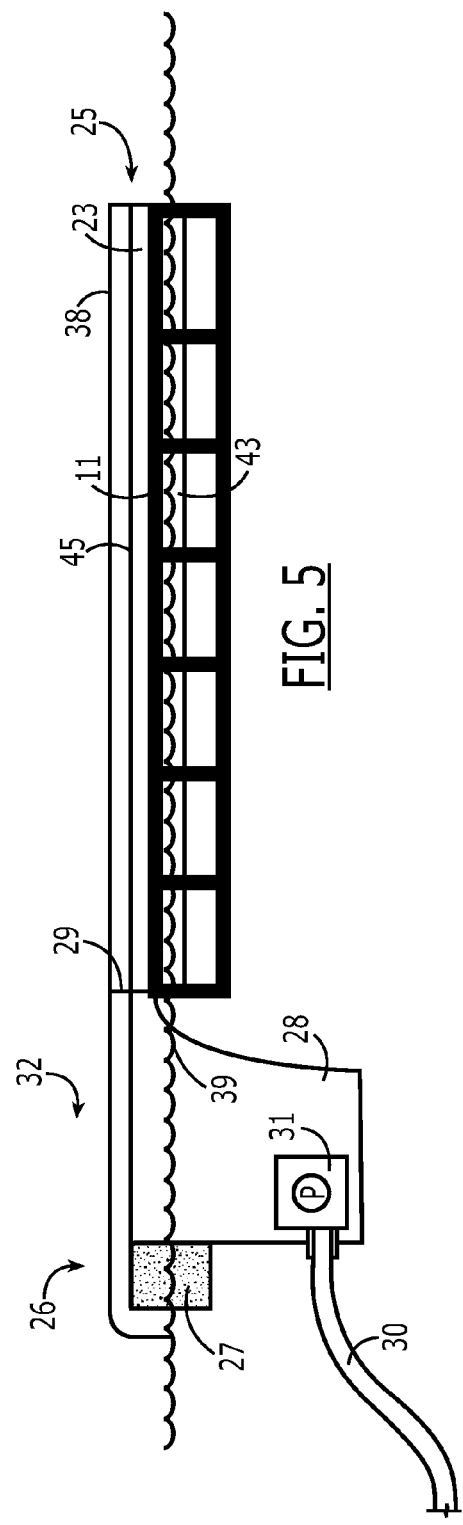
FIG. 5 is a cross-sectional view of the platform in the y direction, illustrating an outflow control system.

Another structural element comprises an outflow control weir 26, whose control elevation is influenced independently from the culture surface by a variably buoyant culture element 27 with flexible attachment 38 to the floating culture surface 11 (FIG. 5). This flexible attachment can be fitted with a floodable basin 28, separated from the platform water 43 with a water-impervious partition 29, with an outlet such as tubing or piping 30. This basin 28 has a top edge 39 no higher than a top edge 45 of the wall 23. The basin 28 can be used for storage of harvested biomass and pumping 31 of harvested biomass, as it is scraped from inlet 25 to outlet 32 end, to a place of collection.

Figure 6:
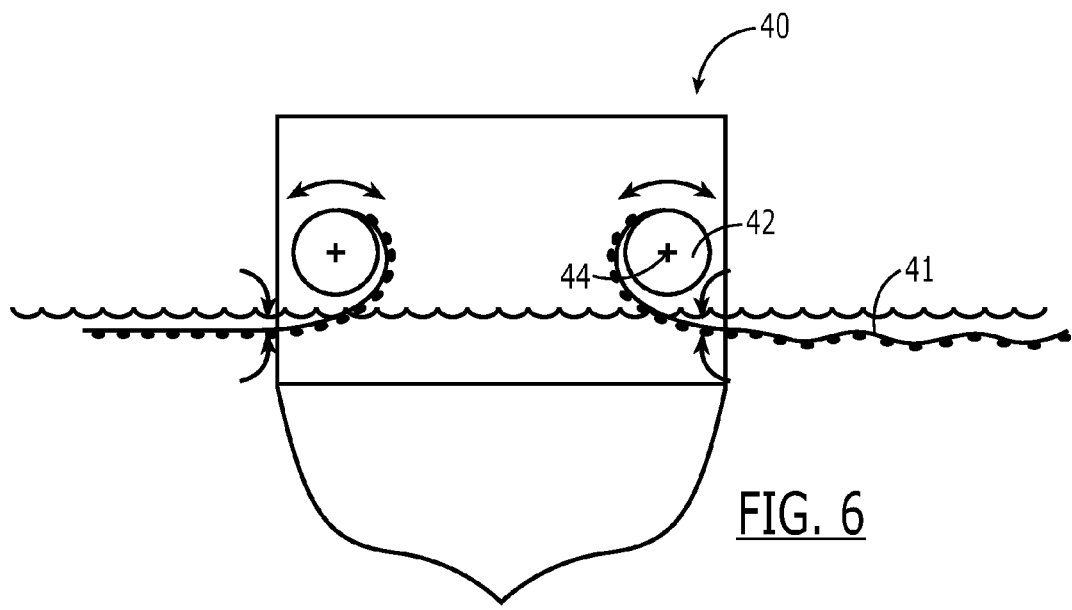
FIG. 6 is a schematic illustration of a culture surface that can be deployed by unrolling.
Figure 7:
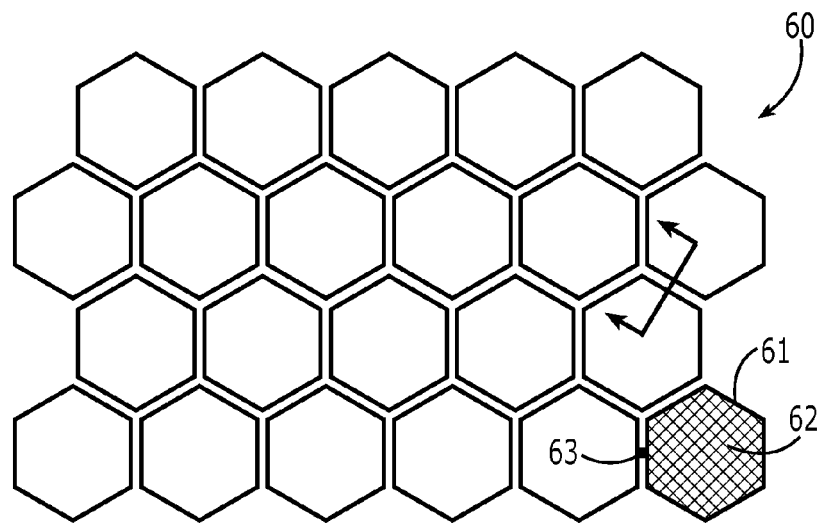
FIG. 7 is a horizontal cross section of a cell system having hexagonal cells.

Another proposed embodiment 40 replaces the impervious cellular culture platform 11 with a porous screen 41 (FIG. 6). In this embodiment, water is caused to move vertically through the culture surface. These flows are driven by waves in the basin as they act against the screen or frame screen composition.

A second pair of component curb beams 42 complements this with stiffness in the y direction. Together the two components provide substantially complete composite stiffness, with flatness that allows consistent depth control over a flexible film which pillows like a sail in water.

The screen 41 can be deployed from a roll 44. Using such a rolled screen 41 allows the harvesting to be done as the screen 41 is rolled up. Rolled screen systems can be rolled up during inclement weather and re-deployed. New screen can be easily replaced as a compact roll. This system 40 is well suited for canal, river, pond, or bay configurations, although this is not intended as a limitation.

In a related embodiment, instead of the screen 41, other types of water-permeable, preferably flexible, material may be used, such as a strong cloth material, or a plastic material having perforations therein, although these are not intended as limitations. The material could be removably affixed to a frame as indicated above. In this embodiment, when the culture is ready for harvest, the entire platform is removed from the frame, by, for example, a grasping means affixed to a floating vessel, and replaced with another section of material. Then the material having the culture thereon is removed by the vessel for biomass harvesting at another site.

Both systems 10,40 maintain flatness and concurrent water depths while allowing flexure during wave events, and use a variably buoyant, hollow beam curb with a floodable core, which can be ballasted to alter the flotation elevation of the construction in high wind events, or for different species of aquatic plants, or precise buoyancy/depth control in fresh and salt waters of varying density. Compressed air from a tending boat is capable of raising or dropping the construction for harvest, desiccation of microinvertabrates, high winds, or maintenance. Additionally, the culture platform retains water as the cells have partially open sides. This water weight keeps the culture system intact during high wind and wave events such as a hurricane. In extreme conditions a rigid vertical skirt can be extended downward from the beam curb periphery of the culture surface and acts as a Torracelli vacuum to add uplift resistance during wind and wave events.

Floating plant culture systems have several distinct advantages over land-based systems. Surface water elevation is largely controlled by gravity. At the scale of humans, water, outside of wind and seismic influences, is level and flat. With a water-supported structure, there is a level and stable platform for support of a plant culture surface. Re-creation and maintenance of a flat and level surface is expensive when the culture system is constructed on soil.

Waves can actually be used to drive the water over the culture surface. Water has a consistent density within a basin and the constructions supported by water have absolutely consistent bearing conditions, which enhances structural efficiency.

The water "head" to be pumped is very low with a floating culture system and never changes, indiscriminate of the water level in the basin. While maintaining a constant level for pumping head, pump and energy requirements remain constant, which reduces pumping hardware and power cost. Floating systems can be easily relocated and take up no land resources, can block light to water reducing phytoplankton growth in water underneath the culture system, and can provide areas of refuge for desirable aquatic organisms.

Previous culture systems known in the art, such as algal culture systems, are fed from one point, and water traverses a horizontal direction where it is continuously subjected to photosynthetic tissue in serial fashion. Both the linear and radial forms of such systems are well suited to the floating configuration. These sequential reactors have the advantage of large inflow to outflow deltas in carbon, nitrogen, phosphorus, and a host of micronutrients such as calcium, iron, magnesium, and boron, among others. For these reasons, point-source pollution, high in nutrients, can be significantly improved using this configuration.

In the case of remediation of polluted surface water, the pollutants are much more diluted. Collection and pumping this dilute solution represents large infrastructure investments. One object of this invention is a new type of culture system, which promotes a largely vertical circulation to the algal culture. In a vertical flow embodiment, a plastic screen is suspended 1-12 in. under the water's surface and naturally accumulates spores of algae in the water. These spores settle on the screen and grow.

As wave action articulates the culture screen, it drives water up and down across the screen, resulting in the inflow and outflow across the same points in the culture surface, from the bottom up and then down through the screen and across the algae. Inflow and outflow occurs across the entire culture surface. Pore size in the screen must be coordinated with speciation and harvesting technique. This concept has a distinct advantage in that it requires no additional pumping or distribution system beyond wind-driven waves.

Another distinct advantage of this system is that control of microinvertabrates can occur from fish and other organisms in the protected water under the culture surface. In land-based systems, various means such as introducing fish 54 cultures (FIG. 8), applying a pyrethrum compound, or desiccation can be required to control microinvertabrates. The layer of water at the surface in close proximity to the culture surface becomes highly oxygenated and devoid of nutrients. These conditions, along with the shading of the culture system, cause significant light reduction, which attenuates planktonic algae populations, such as red tide and other cyanobacteria.

In another embodiment, a basin can have mechanically induced waves that drive the water across the floating culture. In this method, the basin, which can be natural or manmade, lined with HDPE liner, or indigenous or imported earth, is a holding vessel continuously delivering water up through the culture.

In another embodiment, a basin can have mechanically induced flow, in a circular or pill-shaped raceway. This serves the flow across the culture and allows the flow in and out of the basin to be adjusted independently. With this method, flexibility is provided in the water with unique characteristics. Flow aids mixing and energy to drive the water across the floating culture, which can enhance productivity. In this way, the basin, which can be natural or manmade, lined with HDPE liner or indigenous or imported earth, is a holding vessel continuously delivering water up through the culture, as in the vertical-flow system or across it in the horizontal-flow system.

Feed water can be added from one extreme end of the basin and withdrawn from the other. In the case of the conical culture, influent can enter from the center or perimeter and effluent from the opposite point to affect radial flow. Suspended solids can settle to the bottom of the earthen vessel and collected from a low point.

In one embodiment, a modular screen and frame design suites construction with HDPE. In this preferred embodiment, the screen is attached to a frame at the perimeter. The hollow frame has the capability of being flooded for storm resistance related to weather conditions in the region. HDPE can be fusion welded with a melting gun and produces very rigid and strong connections.

Another feature is the utilization of just a screen and no frame. Plastic screens have advanced in stuffiness to the point where they may be used for vertical flow without a frame. In this embodiment, the screen is attached to adjacent screens with restraint clips or hinges, which can be removed and allow harvest or replacement of panels.

Screen pores as well as screen element size vary from marine to fresh water, and with the types of plants supported thereon. In fresh water, pore sizes from 0.125 to 3 in. with screen element (plastic wire) from 0.125 to 2 in This ranges up to pore sizes of 1 to 12 in. with screen element (plastic wire) from 0.25 to 6 in. in marine systems. Combinations of heavy, coarse screens, combined with finer screens, provide both strength and high surface area.

Waves and currents in large water bodies can be very strong at times. Floating culture systems must remain intact during these events. Harvesting can be discontinued during inclement weather events, but it is preferably that the floating culture system remain largely intact even after hurricane force storms traverse its path. It is an important element of this invention to use water to flood the hollow frame, as well as cellular platform and Torracelli skirts, to hold the system in the water during high-wave events. A Torracelli skirt is preferably used only with the horizontal-flow system, which extends the frame volume to a depth of 1-5 ft below the surface, provides a vacuum effect, holding the frames in the water during wind events where uplift could drain the system and allow it to be lifted into the air and displaced.

Air pressure can be used to remove water ballast from the curb beams, much like a submarine, in the event the panel needs to be raised for culture, harvest, desiccation, or largely submerged floating just flush with the water surface for a storm event.

Another embodiment 60 utilizes a multi-axis pattern for the frame 61 and screens 62. In this embodiment, a hexagonal panel 61 (FIG. 7) allows handling of the module in a tight assembly mat when installed in the surface water body. This multi-sided panel 61 allows three axes of articulation, as wave action from many sides displaces the panels 61 in the water. One attachment point 63 at the mid-point on each side allows for complex deformations of the construction induced by wave action.

Another modular plan arrangement allows a circular panel to be assembled. This system has the advantage of being manufactured from a single round or rectangular profile with only one joint in the frame. This circular plan geometry has an advantage in that the surface can be completely harvested with a rotary harvesting implement hung from the side of a harvest tender. Areas between the circles allow light below for conditions where subsurface plants exist.

If a harvest were not executed for a great period of time in a vertical-flow system, the attached growth would eventually completely seal the screen off from the water underneath. In this condition, wind could strip off the surface water and water could not re-flood the culture tray. This situation could allow it to be lifted by high winds. The addition of weighted check valves with the screen allows the culture frame to take water in and causes it to overflow the frame at the perimeter or at an overflow point. This keeps the water ballasted in the culture system frame at all times regardless of the growth on the screen.

Several plan panel configurations exist. As previously mentioned, hexagonal panels can be nested together, which allows for efficient manufacturing and installation. Other geometries, such as squares and octagons, are desirable as well.

Several attachment options exist to hold framed panels or unframed screens. The frame 50 can have interlocking tongue and groove elements 51 (FIG. 8), which transfer shear forces induced by waves. A clip 52, fixed to one frame side 53, holds the tongue and groove elements 51 together while allowing for a loose fit. This loose fit allows the panels to articulate or rotate independently.

Several harvest options exist for floating culture systems. The harvesting system, as in terrestrial agriculture, is greatly dependent on the type of crop that is cultured. Many different species and mixes of species can colonize on the floating culture system. Speciation changes with seasonal fluctuations. To some degree, seeding can control the species. The simplest harvest system is the manual method. A scraper or shovel is utilized to remove the biomass manually. This system loses some biomass to the water depending on the type of plant that is being cultured. Vacuum wands with scraper blades are also combined with a liquid/solid separator to remove biomass from culture frames intact to the culture configuration.

In one embodiment 90 (FIGS. 10A, 10B), a panel 91 can be removed from a frame 92 floating in the water by a boom 93 deployed from a ship 94. The panel 91 is allowed to drain, and then moved into/onto the ship 94, and then scraped or soaked to release the biomass 95 for processing. In the case of marine algae, a screw press, like those produced for the viticulture industry, can be used to dewater the biomass. The panel 91 can then be replaced for re-growth of the culture as desired.

Floating linear floways of both horizontal and vertical designs have an advantage when harvested. A pontoon harvester 80 can straddle the floway 81, lifting it up and dewatering it in a zone to be harvested (FIG. 9). As the pontoon harvester 80 moves along the linear culture system 81, the culture surface is raised and the algal harvest is removed.

Harvested biomass can be used in fuel production by methanization, fermentation, and/or distillation. In one embodiment, the fermentation facility is constructed aboard ship. This allows construction of the apparatus and point-of-use to be different and optimized for economy. Transfer of biomass to a land-based power production facility is efficient, as biomass can be easily pumped or conveyed for offloading.

There are several options for mooring or fixing the panel constructions to a stationary location in the surface water body. Anchors and tether systems are the typical means utilized to fix the location of the construction.

A power means, such as a fuel- or solar-powered boat motor with coordinated global positioning system (GPS), can be used to keep the construction in place, or move it to various locations with remote piloting means. Tether and ballasted systems can be deployed to secure this construction in inclement conditions.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the system illustrated and described herein are by way of example, and the scope of the invention is not limited to the exact details of construction and use.

Having now described the invention, the construction, the operation and use of preferred embodiments thereof, and the advantageous new and useful results obtained thereby, the new and useful constructions, and reasonable equivalents thereof obvious to those skilled in the art, are set forth in the appended claims.

What is claimed is:

1. A method for cleansing water comprising:
    attaching an aquatic plant culture to a platform comprising a surface adapted for growing the attached plant culture thereon, the surface comprising a plurality of cells affixed therebeneath, each cell having at least one open end, the porosity and the open end for admitting water to the plant culture and to provide ballast and assist in retaining the platform in the water body during periods of high wind, the platform further comprising a floatable frame from which the platform surface is removable, wherein the frame comprises a pair of beams affixable to the platform surface along opposed sides thereof, the flotation device affixed to the platform surface and adapted to place the platform surface in communication with water in a body of water, the flotation device floatable atop the water body, water reaching the giant culture cleanable thereby;
    floating the platform in the water body, the platform surface adjacent a surface of the water body, at least a portion of the platform surface being porous;
    permitting water from the water body to contact the plant culture through the porous platform surface, the plant culture adapted for removing undesired matter from the water; and
    harvesting plant biomass from the plant culture by removing the platform surface from the water body, and harvesting the biomass at a location apart from the water body while leaving the floatable frame of the platform in place in the water body.

2. The method recited in claim 1, further comprising surging water over the surface to enhance plant culture growth.

3. The method recited in claim 1, wherein the attaching comprises attaching a periphyton culture to the platform surface.

4. The method recited in claim 1, wherein the harvesting comprises scraping the biomass from the platform surface in situ, and conveying the scraped-off biomass from the platform to a collection site.

5. The method recited in claim 1, further comprising using the harvested biomass for power production.

6. A system for cleansing water comprising:
    a platform having a surface adapted for growing an attached plant culture thereon, the plant culture adapted for removing undesired matter from the water, the platform surface porous, the platform comprising a plurality of cells affixed therebeneath, each cell having at least one open end, the porosity and the open end for admitting water to the plant culture and to provide ballast and assist in retaining the platform in the water body during periods of high wind; and
    a flotation device comprising a pair of beams affixed to the platform along opposed sides thereof, the flotation device affixed to the platform adapted to place the platform surface in communication with water in a body of water, the flotation device floatable atop the water body, water reaching the plant culture cleanable thereby.

7. The system recited in claim 6, wherein the platform, the cells, and the beams comprise at least one of a plastic, a textile material, and a wood material.

8. The system recited in claim 6, wherein the platform, the cells, and the beams comprise high-density polyethylene.

9. The system recited in claim 6, wherein the platform has at least one opening positioned above an underside of the platform, for to admitting water onto the platform surface from a lateral direction.

10. A system for cleansing water comprising:
    a platform having a surface adapted for growing an attached plant culture thereon, the plant culture adapted for removing undesired matter from the water, the platform surface porous for admitting water to the plant culture, the platform further having a wall, the wall having a check valve therein for admitting water when the platform is tilted in a first directions and for retaining water when the platform is tilted in a second direction opposite the first direction; and
    a flotation device affixed to the platform adapted to place the platform surface in communication with water in a body of water, the flotation device floatable atop the water body, water reaching the plant culture cleanable thereby.

11. A system for cleansing water comprising:
a platform having a surface adapted for growing an attached plant culture thereon, the plant culture adapted for removing undesired matter from the water, the platform surface porous for admitting water to the plant culture;
a wall extending about the platform in surrounding relation to the platform surface;
a basin affixed to the platform and having a wall adjacent the platform having a top edge no higher than a top edge of the platform;
an outflow control weir for controlling a flow of matter from the platform to the basin;
a flotation device affixed to the platform adapted to place the platform surface in communication with water in a body of water, the flotation device floatable atop the water body, water reaching the plant culture cleanable thereby; and
a flotation element affixed to the outflow control weir, for controlling a position thereof, the basin for receiving harvested biomass from the plant culture on the platform surface.

12. The system recited in claim 11, further comprising tubing extending from the basin, for transporting the harvested biomass therethrough to a remote location.

13. A system for cleansing water comprising:
a platform having a surface adapted for growing an attached plant culture thereon, the plant culture adapted for removing undesired matter from the water, the platform surface porous for admitting water to the plant culture;
a flotation device affixed to the platform adapted to place the platform surface in communication with water in a body of water, the flotation device floatable atop the water body, water reaching the plant culture cleanable thereby; and
a harvester for harvesting the biomass from the platform surface, wherein the harvester comprises a vessel having a boom deployable from the vessel, and the platform comprises a floatable portion and the platform surface is removable therefrom using the boom, leaving the floatable portion in the water body, the biomass removable from the platform surface at a location apart from the floatable portion.

14. The system recited in claim 13, wherein the harvester comprises a scraper for scraping the biomass from the platform surface in situ, and a conveyer for conveying the scraped-off biomass from the platform to a collection site.

15. The system recited in claim 14, further comprising means for converting the harvested biomass for power production.

* * * * *